(12) United States Patent
Ou et al.

(10) Patent No.: US 12,063,244 B1
(45) Date of Patent: Aug. 13, 2024

(54) PROTECTING COMPUTERS FROM MALICIOUS DISTRIBUTED CONFIGURATION PROFILES

(71) Applicant: Trend Micro Inc., Tokyo (JP)

(72) Inventors: Yilu Ou, Nanjing (CN); Changxi Cao, Nanjing (CN); Liangzhi Zhang, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 221 days.

(21) Appl. No.: 17/867,019

(22) Filed: Jul. 18, 2022

(51) Int. Cl.
*H04L 29/06* (2006.01)
*H04L 9/40* (2022.01)
*G06F 40/143* (2020.01)
*H04N 21/8543* (2011.01)

(52) U.S. Cl.
CPC ........ *H04L 63/1441* (2013.01); *G06F 40/143* (2020.01); *H04N 21/8543* (2013.01)

(58) Field of Classification Search
CPC .................................................. H04L 63/1441
USPC .......................................................... 726/25
See application file for complete search history.

(56) References Cited

U.S. PATENT DOCUMENTS

| | | | | |
|---|---|---|---|---|
| 8,584,233 B1 * | 11/2013 | Yang | ....................... | G06F 21/51 |
| | | | | 713/188 |
| 9,953,372 B1 * | 4/2018 | Dziabiak | ................ | G06Q 40/08 |
| 10,061,921 B1 * | 8/2018 | Chang | ................... | G06F 21/554 |
| 10,534,928 B1 * | 1/2020 | Roden | .................... | G06N 20/10 |
| 10,592,554 B1 * | 3/2020 | Merritt | ..................... | G06N 5/01 |
| 2012/0173508 A1 * | 7/2012 | Zhou | ..................... | G06F 16/951 |
| | | | | 707/E17.014 |
| 2017/0004454 A1 * | 1/2017 | Tang | ..................... | H04L 67/306 |
| 2017/0004455 A1 * | 1/2017 | Tang | .................. | G06Q 10/1053 |
| 2018/0336640 A1 * | 11/2018 | Dziabiak | ................ | G06N 20/20 |
| 2019/0095822 A1 * | 3/2019 | Rugel | ..................... | G06N 20/00 |
| 2020/0234185 A1 * | 7/2020 | Rugel | ..................... | G16H 50/20 |
| 2020/0242171 A1 * | 7/2020 | Pogrebezky | ............. | G06N 5/01 |
| 2020/0284602 A1 * | 9/2020 | Larson | ............... | G01C 21/3484 |
| 2023/0231822 A1 * | 7/2023 | Cuan | ....................... | G06F 40/30 |
| | | | | 704/9 |

FOREIGN PATENT DOCUMENTS

CN 111143981 B * 9/2023 ............. G06F 16/81

OTHER PUBLICATIONS

"Decision tree learning", https://en.wikipedia.org/w/index.php?title=Decision_tree_learning&oldid=1125700746, Wikipedia, lasted edited Jun. 15, 2022, p. 1.
Apple Developer, "Configuration Profile Reference", https://developer.apple.com/business/documentation/Configuration-Profile-Reference.pdf, pp. 1-123, May 3, 2019.

* cited by examiner

*Primary Examiner* — Haresh N Patel
(74) *Attorney, Agent, or Firm* — Beyer Law Group LLP

(57) ABSTRACT

An endpoint computer is protected from malicious distributed configuration profiles. The endpoint computer receives a distributed configuration profile over a computer network. Before installation of the distributed configuration profile in the endpoint computer, features of the distributed configuration profile are used to traverse a supervised decision tree. A rating score is generated based on weights of nodes of the supervised decision tree that are traversed using the features of the distributed configuration profile. The distributed configuration profile is detected to be malicious based at least on the rating score.

20 Claims, 11 Drawing Sheets

200 

```
<key>mcx_preference_settings</key>
<dict>
        <key>ShowFavoritesBar</key>
        <false/>
        <key>AutoFillCreditCardData</key>    ⎫ 201
        <false/>                             ⎭
        <key>HomePage</key>                          ⎫
205 ⎯ <string>http://www.faceboot.net/</string>    ⎬ 203
        <key>NewWindowBehavior</key>                 ⎭
        <integer>0</integer>
        <key>NewTabBehavior</key>
        <integer>1</integer>
        <key>AutoFillPasswords</key>    ⎫ 202
204 ⎯ <false/>                           ⎭
        <key>AutoFillMiscellaneousForms</key>
        <false/>
        <key>AutoFillFromAddressBook</key>
        <false/>
        <key>DownloadsPath</key>
        <string>~/Downloads</string>
        <key>DownloadsClearingPolicy</key>
        <integer>1</integer>
        <key>AlwaysShowTabBar</key>
        <true/>
</dict>
```

252
```
<key>PayloadContent</key>
<dict>
    <key>com.google.Chrome</key>
    <dict>
        <key>Forced</key>
        <array>
            <dict>
                <key>mcx_preference_settings</key>
                <dict>
                    <key>HomepageIsNewTabPage</key>
                    <true/>
                    <key>HomepageLocation</key>         253
                    <string>http://www.faceboot.net</string>
                    <key>NewTabPageLocation</key>       254
                    <string>http://www.faceboot.net</string>
                </dict>
            </dict>
        </array>
    </dict>
</dict>
</dict>
</plist>
```

FIG. 4

260 

```
<?xml version="1.0" encoding="UTF-8"?>
<!DOCTYPE plist PUBLIC "-//Apple//DTD PLIST 1.0//EN" "http://www.apple.com/DTDs/PropertyList-1.0.dtd">
<plist version="1.0">
<dict>
        <key>PayloadIdentifier</key>                        ⎫ 261
        <string>org.sacredsf.profile.joseph</string>        ⎭
        <key>PayloadRemovalDisallowed</key>                 ⎫ 262
        <true/>                                             ⎭
        <key>PayloadScope</key>                             ⎫ 263
        <string>System</string>                             ⎭
        <key>PayloadType</key>
        <string>Configuration</string>
        <key>PayloadUUID</key>
        <string>bf900530-2306-0131-32e2-000c2944c108</string>
        <key>PayloadOrganization</key>
        <string>Schools of the Sacred Heart</string>
        <key>PayloadVersion</key>
        <integer>1</integer>
        <key>PayloadDisplayName</key>
        <string>Safari</string>
        <key>PayloadContent</key>
        <array>
                <dict>
                        <key>PayloadType</key>                                  ⎫ 264
                        <string>com.apple.ManagedClient.preferences</string>    ⎭
                        <key>PayloadVersion</key>
                        <integer>1</integer>
                        <key>PayloadIdentifier</key>
                        <string>com.apple.mdm.VMServer.local.bf900530-2306-0131-32e2-
000c2944c108.alacarte.customsettings.91baa300-2307-0131-32e5-000c2944c108</string>
                        <key>PayloadUUID</key>
                        <string>91baa300-2307-0131-32e5-000c2944c108</string>
                        <key>PayloadEnabled</key>
                        <true/>
                        <key>PayloadDisplayName</key>
                        <string>Custom: (com.apple.Safari)</string>      ~265
```

271 ～ `<key>PayloadContent</key>`
`<dict>`
  `<key>com.apple.Safari</key>`
  `<dict>`
    `<key>Forced</key>` ～ 272
    `<array>`
      `<dict>`
        `<key>mcx_preference_settings</key>`
        `<dict>`
          `<key>ShowFavoritesBar</key>`
          `<false/>`
          `<key>AutoFillCreditCardData</key>`
          `<false/>`
          274 { `<key>HomePage</key>`
          `<string>http://www.faceboot.net/</string>`
          `<key>NewWindowBehavior</key>`
          `<integer>0</integer>`
          `<key>NewTabBehavior</key>`
          `<integer>1</integer>`
          273 { `<key>AutoFillPasswords</key>`
          `<false/>`
          `<key>AutoFillMiscellaneousForms</key>`
          `<false/>`
          `<key>AutoFillFromAddressBook</key>`
          `<false/>`
          `<key>DownloadsPath</key>`
          `<string>~/Downloads</string>`
          `<key>DownloadsClearingPolicy</key>`
          `<integer>1</integer>`
          `<key>AlwaysShowTabBar</key>`
          `<true/>`
        `</dict>`
      `</dict>`
    `</array>`
  `</dict>`
  `</dict>`
`</dict>`
`</array>`
`</dict>`
`</plist>`

FIG. 6

PROTECTING COMPUTERS FROM MALICIOUS DISTRIBUTED CONFIGURATION PROFILES

TECHNICAL FIELD

The present invention is directed to cybersecurity, and more particularly to protecting computers from malicious distributed configuration profiles.

BACKGROUND

Configuration profiles indicate the operational settings of a computer, such as user preferences. For example, a configuration profile for a web browser may indicate the home page for the web browser, whether certain autofill functions are enabled, and other user-configurable settings. With certain operating systems, configuration profiles are "distributed" in that they may be downloaded or created in one computer and thereafter forwarded and installed in another computer. For example, in APPLE operating systems, such as the macOS™, iOS™, and iPadOS™ operating systems, a configuration profile may be created in one APPLE device (i.e., a computing device that runs an APPLE operating system) and automatically or manually forwarded to and installed in other APPLE devices. An APPLE device receiving a configuration profile can automatically install the configuration profile when the user taps an install button or similar user interface. The ability to distribute and automatically install configuration profiles advantageously simplify device management and allow a network administrator to standardize settings for a group of computers that belong to the network.

BRIEF SUMMARY

In one embodiment, a method of protecting computers from malicious distributed configuration profiles includes receiving a distributed configuration profile in an endpoint computer over a computer network, the distributed configuration profile being in Extensible Markup Language (XML) format and indicating at least one user-configurable setting of the endpoint computer. Before installing the distributed configuration profile in the endpoint computer, a supervised decision tree is traversed using XML keys and corresponding values of the XML keys (XML keys-values) of the distributed configuration profile, the supervised decision tree comprising a plurality of nodes that represent XML keys and a plurality of arcs that represent values of XML keys that are represented as nodes. A rating score of the distributed configuration profile is generated based on weights assigned to nodes that are traversed using the XML keys-values of the distributed configuration profile. The distributed configuration profile is detected to be malicious based at least on the rating score.

In another embodiment, a system for protecting computers against malicious distributed configuration profiles comprises an endpoint computer and a backend system. The endpoint computer is configured to detect that a distributed configuration profile is malicious based at least on a rating score of the distributed configuration profile. The backend system is configured to, before installation of the distributed configuration profile in the endpoint computer: receive Extensible Markup Language (XML) keys and corresponding values of the XML keys (XML keys-values) of the distributed configuration profile from the endpoint computer over a computer network; traverse a supervised decision tree using the XML keys-values of the distributed configuration profile, the supervised decision tree comprising a plurality of nodes that represent XML keys and a plurality of arcs that represent values of XML keys that are represented as nodes; and generate the rating score based on weights assigned to nodes that are traversed using the XML keys-values of the distributed configuration profile.

In yet another embodiment, a method of protecting computers from malicious distributed configuration profiles includes receiving a distributed configuration profile in an endpoint computer over a computer network, the distributed configuration profile being in Extensible Markup Language (XML) format and indicating at least one user-configurable setting of the endpoint computer. The distributed configuration profile is forwarded from the endpoint computer to a backend system over the computer network. Before the distributed configuration profile is installed in the endpoint computer, a supervised decision tree is traversed in the backend system using XML keys and corresponding values of the XML keys (XML keys-values) of the distributed configuration profile, the supervised decision tree comprising a plurality of nodes that represent XML keys and a plurality of arcs that represent values of XML keys that are represented as nodes. A rating score of the distributed configuration profile is generated based on weights assigned to nodes that are traversed in the supervised decision tree using the XML keys-values of the distributed configuration profile. The distributed configuration profile is detected to be malicious based at least on the rating score.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 2-6 show example distributed configuration profiles that may be evaluated by the system of FIG. 1.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention are explained in the context of APPLE operating systems, such as the macOS™ operating system, iOS™ operating system, and iPadOS™ operating system, for illustration purposes only. One of ordinary skill in the art will recognize that embodiments of the present invention are equally applicable to similar operating systems that allow for distributed configuration profiles.

Figure 1:
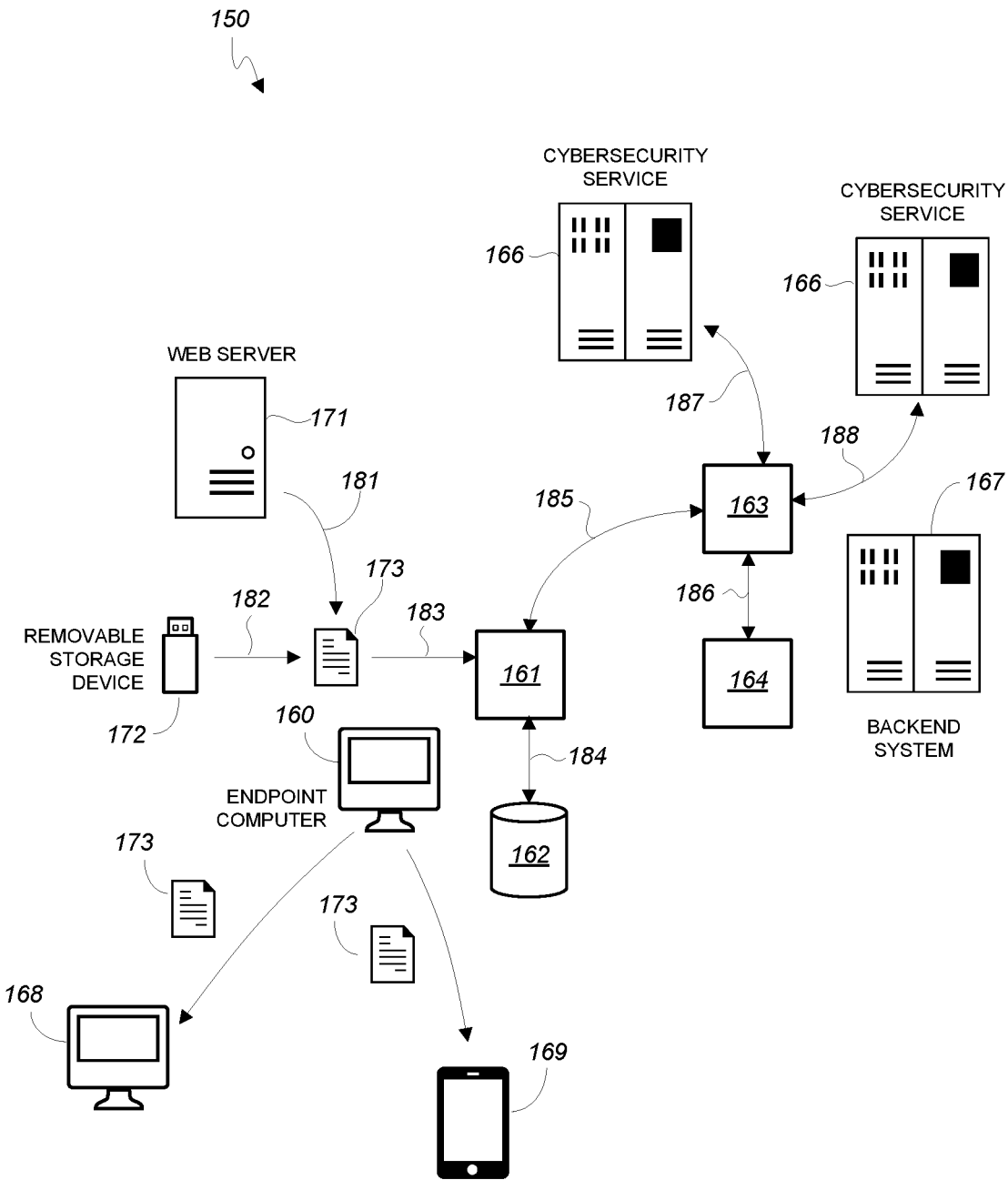
FIG. 1 shows a logical diagram of a system for protecting computers from malicious distributed configuration profiles in accordance with an embodiment of the present invention.

FIG. 1 shows a logical diagram of a system 150 for protecting computers from malicious distributed configuration profiles in accordance with an embodiment of the present invention. In the example of FIG. 1, the system 150 includes one or more endpoint computers 160, a backend system 167, and one more cybersecurity services 166.

An endpoint computer 160 is a computer where one or more distributed configuration profiles are evaluated to determine whether or not they are malicious. An endpoint computer 160 may be a desktop computer, laptop computer, or other computing device. In one embodiment, the endpoint computer 160 is an APPLE device, i.e., runs an APPLE operating system. Accordingly, the endpoint computer 160 can accept a distributed configuration profile 173 ("profile 173") from a web server 171 over the Internet (see arrow 181), from a removable storage device 172 (e.g., Universal Serial Bus (USB) drive) (see arrow 182), or generally over a computer network. The profile 173 is a "target" distributed configuration profile in that it will be evaluated before installation in the endpoint computer 160.

In one embodiment, the profile 173 is for an APPLE operating system. The profile 173 is in Extensible Markup Language (XML) format and may specify settings for a web browser, WiFi connection, Virtual Private Network (VPN) connection, email account, and/or other user-configurable settings. The profile 173 is provided to the endpoint computer 160 as an XML file with a ".mobileconfig" filename extension. In a distributed configuration profile, a setting is represented by a configuration profile key ("key"). The value of a key may be changed to configure a corresponding setting. As its name indicates, an XML key is a configuration profile key in XML format.

Unlike other types of file contents, a distributed configuration profile comprises data that are inherently normal, i.e., non-malicious. This is because a distributed configuration profile indicates settings that users are generally allowed to configure. Conventional approaches for detecting malicious executable files, when applied to distributed configuration profiles, may thus lead to high false positive rates, i.e., incorrectly detecting normal (safe) data as malicious. As will be more apparent below, embodiments of the present invention may employ a supervised decision tree, which is especially effective in detecting malicious distributed configuration profiles that have key-value type features. The supervised decision tree may be used in conjunction with cybersecurity intelligence from other sources and with options that further minimize false positives.

In one embodiment, a distributed configuration profile checker 161 ("profile checker 161") runs on the endpoint computer 160. The profile checker 161 may comprise program code, i.e., instructions stored in a main memory for execution by a processor. The profile checker 161 receives an install event notification from the operating system of the endpoint computer 160 when a distributed configuration profile is about to be installed in the endpoint computer 160. Endpoint Security Application Programming Interfaces (APIs) provided to APPLE-certified security vendors may be employed to receive the install event notification, block or allow installation of a distributed configuration profile, or perform other security-related operation.

In response to receiving the install event notification and before the distributed configuration profile is installed in the endpoint computer 160, the profile checker 161 evaluates the distributed configuration profile to determine whether or not the distributed configuration profile is malicious. As a particular example, when the profile 173 is to be installed in the endpoint computer 160, the profile checker 161 gets a corresponding install event notification, receives the profile 173 (see arrow 183), and extracts features of the profile 173. Being an XML document, the features may include data in the document prolog section and document elements section of the profile 173. In one embodiment, the features include XML keys and their corresponding values. Examples of these features include a ShowFavoritesBar key, HomePage key, AutoFillPasswords key and other XML keys that are designated as configuration profile keys in APPLE operating systems. XML keys that are available in an APPLE operating system are described in a corresponding APPLE Configuration Profile Reference document. XML keys and their corresponding values are also referred to herein as "XML keys-values".

A local database 162 stores features and/or combinations of features of known malicious distributed configuration profiles. The database 162 is "local" in that it is accessible locally on the endpoint computer 160. Known malicious distributed configuration profiles may be obtained from honey pots, cybersecurity researchers, cybersecurity feeds, user submissions, and other sample sources. Features of known malicious distributed configuration profiles may be formed into a pattern (e.g., regular expression) for comparison with features of a target distributed configuration profile. A target distributed configuration profile having features that match those of one or more known malicious distributed configuration profiles are deemed to be malicious. The matching may be exact or partial depending on implementation.

In the example of FIG. 1, the profile checker 161 consults the local database 162 to determine if the profile 173 has features that match those of a known malicious distributed configuration profile (see arrow 184). For example, the profile checker 161 may compare the XML keys-values of the profile 173 to XML keys-values of known malicious distributed configuration profiles to determine whether or not the profile 173 is malicious.

A backend system 167 comprises a computer system that provides a distributed configuration profile evaluation service in-the-cloud, i.e., over the Internet. As can be appreciated, the backend system 167 may also be deployed as a service over a private computer network. Furthermore, all or some functionality of the backend system 167 may be implemented in the endpoint computer 160 to provide offline evaluation capability. In one embodiment, a scoring module 163 and a machine learning model in the form of a supervised decision tree 164 are implemented as program code running on the backend system 167. The decision tree 164 is configured to rate a distributed configuration profile based on features of the distributed configuration profile. The rating score generated from the decision tree 164 is indicative of whether or not the distributed configuration profile is malicious.

In one embodiment, the backend system 167 is in communication with other computer systems that host one or more cybersecurity services 166 over the Internet. The cybersecurity services 166 may comprise publicly-available services that may have cybersecurity intelligence on a distributed configuration profile. The cybersecurity services 166 may provide a web reputation service, file reputation service, file census information, etc. The scoring module 163 may provide the profile 173 to the cybersecurity services 166. The cybersecurity services 166 may provide the scoring module 163 cybersecurity intelligence on the profile 173. The cybersecurity services 166 may provide cybersecurity intelligence indicating that the profile 173 is most likely malicious, possibly malicious, safe, etc.

In the example of FIG. 1, when the features of the profile 173 do not match one or more features of known malicious distributed configuration profiles in the local database 162, the profile checker 161 consults with backend system 167 to determine whether or not the profile 173 is malicious (see arrow 185). Because the profile 173 has a relatively small size, the profile checker 161 may simply provide the entirety of the profile 173 (e.g., in a wrapper) to the backend system 167. In the backend system 167, the scoring module 163 receives the profile 173 and inputs the features of the profile 173 to the decision tree 164 (see arrow 186). The scoring module also provides the profile 173 to one or more cybersecurity services 166 to receive cybersecurity intelligence on the profile 173 (see arrows 187 and 188).

The scoring module 163 receives a rating score from the decision tree 164 (see arrow 186) and cybersecurity intelligence from the cybersecurity services 166 (see arrows 187 and 188) for the profile 173. The scoring module 163 generates an overall score by adjusting the rating score based on the cybersecurity intelligence received from the cybersecurity services 166.

FIG. 2 shows an example distributed configuration profile that may be evaluated by the system 150. In the example of FIG. 2, a distributed configuration profile 200 for an APPLE operating system has XML keys for setting automatic credit card data entry (see FIG. 2, 201), automatic password entry (see FIG. 2, 202), the homepage of the web browser (see FIG. 2, 203), etc. In the example of FIG. 2, the value for automatic password entry is set to FALSE (see FIG. 2, 204), meaning that passwords will not be automatically entered. Note that by itself, disabling automatic password entry is not necessarily malicious. However, disabling automatic password entry in combination with setting the homepage to a suspicious website ("faceboot.net") (see FIG. 2, 205) may expose the endpoint computer to being victimized.

When the profile 200 is received and installed in an endpoint computer, the endpoint computer's web browser will be directed to the suspicious website and, because automatic password entry is disabled, the user may end up entering her password into the suspicious website. Worse, when the profile 200 is distributed as part of a Distributed Device Management (MDM) group deployment, the profile 200 may be designated as a Managed Preferences for MacOS (MCX) setting that cannot be changed, resulting in all computers belonging to the MDM group being victimized. The decision tree 164 may rate the profile 200 based on XML keys-values of the profile 200, including XML keys-values for setting automatic password entry, home page of the web browser, etc.

Figure 3:

FIGS. 3 and 4 show a distributed configuration profile 240 for setting the GOOGLE Chrome™ web browser on an APPLE device. Note that line 241 on FIG. 3 is immediately followed by line 252 on FIG. 4. Similar to the profile 200 of FIG. 2, the profile 240 is configured to victimize an endpoint computer by setting the home page (see FIG. 4, 253) and new tab page location (see FIG. 4, 254) of the GOOGLE Chrome™ web browser to the suspicious "faceboot.net" website.

FIGS. 5 and 6 show a distributed configuration profile 260 for setting the APPLE Safari™ web browser on an APPLE device. Note that line 265 on FIG. 5 is immediately followed by line 271 on FIG. 6. Similar to the profile 200 of FIG. 2, the profile 260 is configured to victimize an endpoint computer by disabling automatic password entry (see FIG. 6, 273) and setting the home page (see FIG. 6, 274) of the APPLE Safari™ web browser to the suspicious "faceboot.net" website. Relevant XML keys-values of the profile 260 will be later discussed with reference to FIG. 8.

Figure 7:
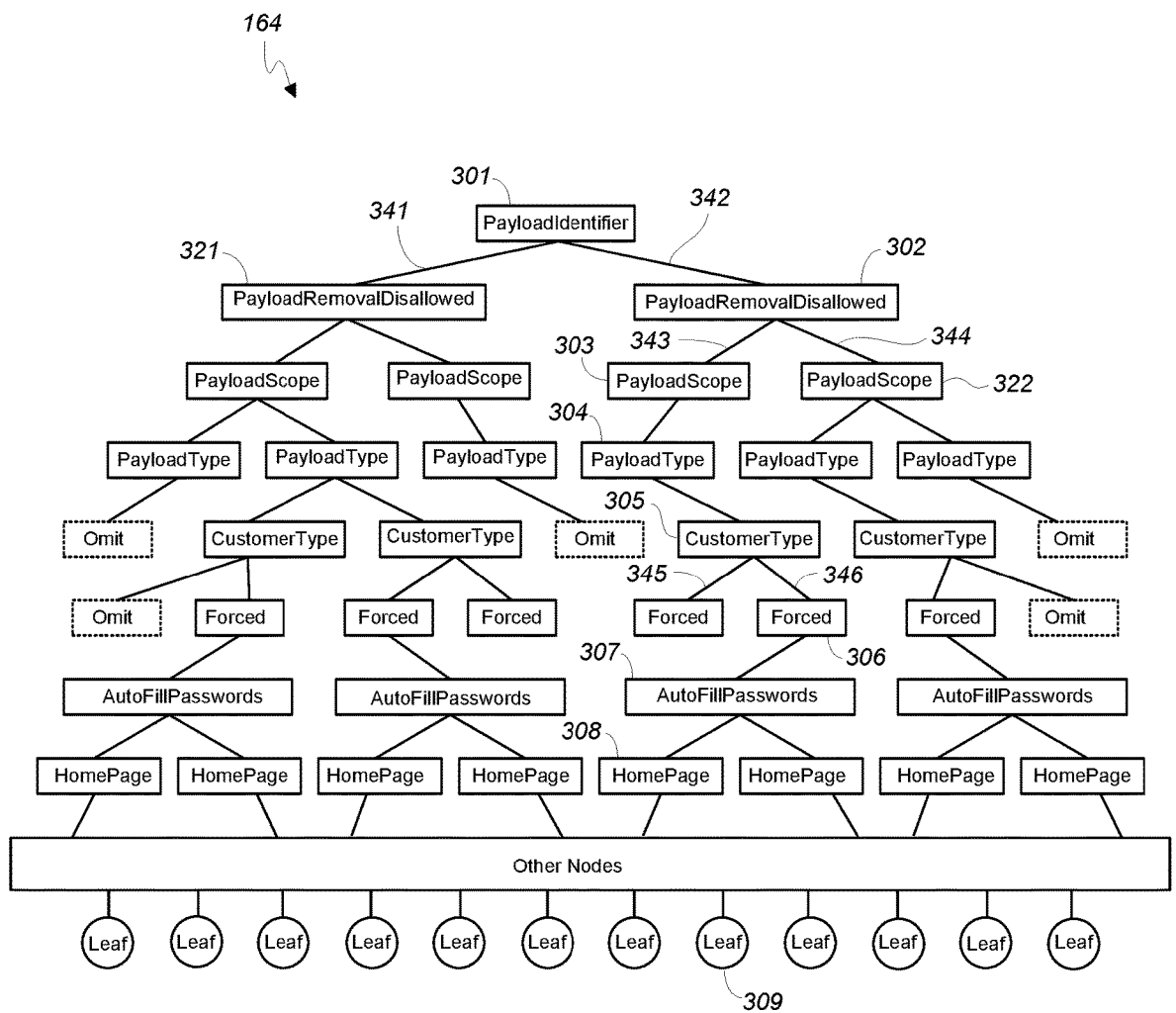
FIG. 7 shows a logical diagram of a supervised decision tree in accordance with an embodiment of the present invention.

FIG. 7 shows a logical diagram of a supervised decision tree 164 in accordance with an embodiment of the present invention. The decision tree 164 comprises nodes that represent XML keys and arcs that represent values of corresponding XML keys that are represented by the nodes. For example, node 301 represents the PayloadIdentifier key, nodes 321 and 302 each represents the PayloadRemovalDisallowed key, nodes 303 and 322 each represents the PayloadScope key, etc. An arc flowing from a node represents a value of the XML key represented by the node. For example, arcs 341 and 342 represent different string values for the PayloadIdentifier key, arc 343 represents a TRUE value for the PayloadRemovalDisallowed key, arc 344 represents a FALSE value for the PayloadRemovalDisallowed key, etc.

As can be appreciated, string values may be expressed as regular expressions. Also, FIG. 7 shows a relatively small number of nodes and arcs for clarity of illustration. For example, nodes ("Other nodes") between the leaf nodes and nodes representing the HomePage keys are not shown. In practice, the decision tree 164 will have much more nodes and arcs to accommodate a large number of configuration profile keys that may be exploited by cybercriminals. The decision tree 164 may be constructed using a conventional supervised decision tree construction algorithm in conjunction with the present disclosure.

In one embodiment, the decision tree 164 includes non-key (i.e., not a distributed configuration profile key) nodes that allow the rating score to be optimized for particular applications. For example, node 305 allows the type of customer (e.g., the user as an employee of a company or the user as an individual customer) to be considered in rating a distributed configuration profile. Arc 345 represents an "individual" value for the node 305 and arc 346 represents a "company" value for the node 305. The scoring module 163 may set the value of non-key nodes for each user, such as based on the particular endpoint computer that sent the distributed configuration profile.

A leaf node, which is also referred to as a terminal node, does not split into further nodes. In one embodiment, the leaf nodes (see FIG. 7, "Leaf") of the decision tree 164 provides a rating score based on a path traversed using XML keys-values of the distributed configuration profile. The decision tree 164 has a root node through which inputs are passed through. In the example of FIG. 7, node 301 is the root node. The decision tree 164 is traversed from top to bottom, beginning with the root node, with each of the traversed nodes contributing to the rating score that is provided at a corresponding leaf at the bottom of the decision tree 164.

As an example, the profile 260 (shown in FIGS. 5 and 6) is now evaluated by extracting its XML keys-values and using the XML keys-values to traverse the decision tree 164.

Figure 8:
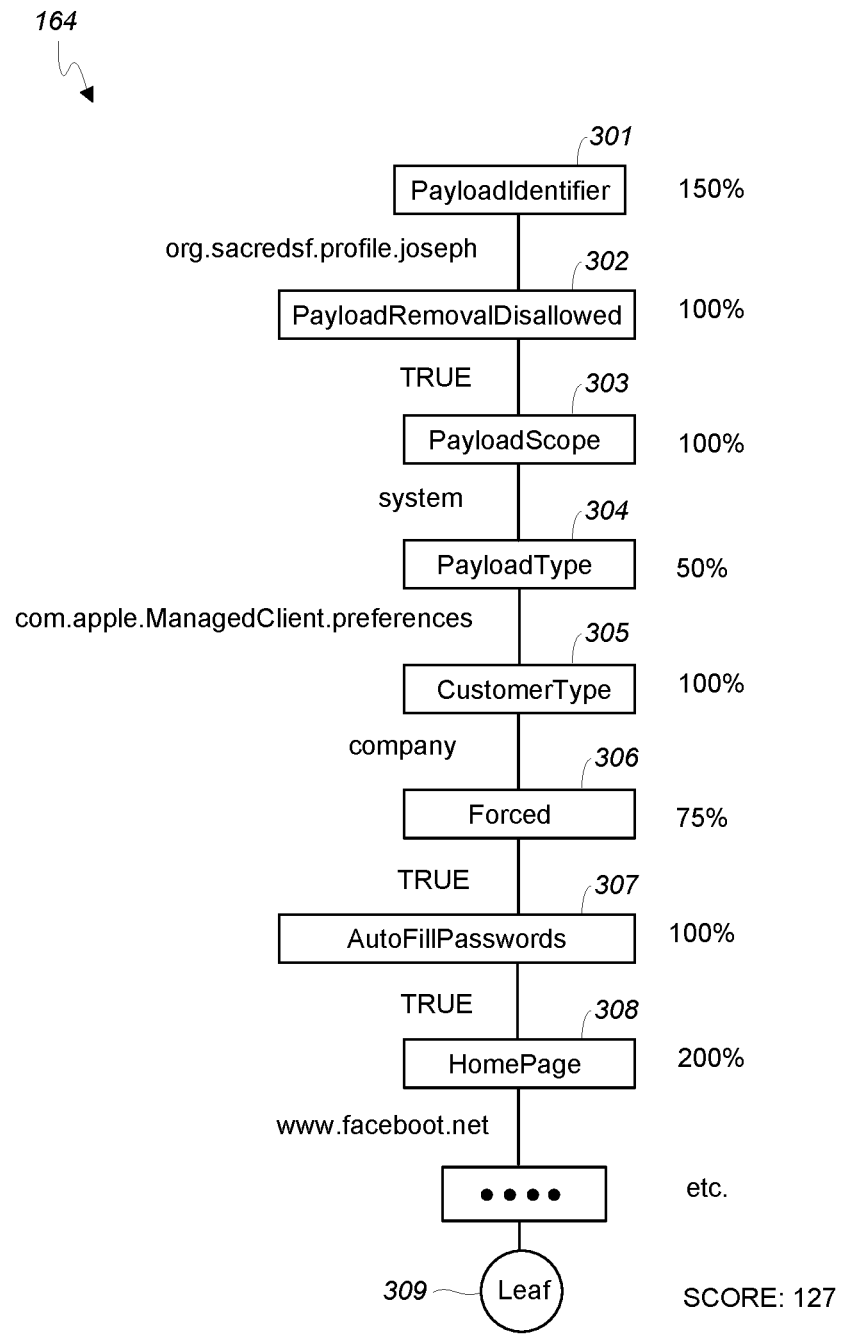
FIG. 8 shows nodes of the supervised decision tree of FIG. 7 that are traversed using XML keys and corresponding values of the XML keys of an example distributed configuration profile.

FIG. 8 shows the nodes 301-308 that are traversed using XML keys-values of the profile 260. The nodes 301-308 are also labeled in FIG. 7 for references purposes.

Referring to FIG. 8, traversing the decision tree 164 starts at the root node 301, where the PayloadIdentifier key has the value "org.sacredsf.profile.joseph" in the profile 260 (see FIG. 5, 261). Accordingly, the traversal path follows an arc that continues to the node 302 that represents the Payload-RemovalDisallowed key, which has a TRUE value in the profile 260 (see FIG. 5, 262). The traversal through the decision tree 164 continues in accordance with the values of the PayloadScope key (node 303; see FIG. 5, 263), PayloadType key (node 304; see FIG. 5, 264), CustomerType key (node 305; set as "company"), Forced key (node 306; see FIG. 6, 272), AutoFillPasswords key (node 307; FIG. 6, 273), HomePage key (node 308; see FIG. 6, 274), and other keys in the profile 260. The customer type (node 305) is "company" in this example and is set specifically for the particular endpoint computer that sent the input distributed configuration profile. Each node of the decision tree 164 is assigned a percentage weight. In the example of FIG. 8, the path traversed using XML keys-values of the profile 260 gives a score at the leaf node 309 based on the percentage weights assigned to nodes 301-308 and other nodes traversed using the XML keys-values of the profile 260.

In one embodiment, the rating score generated by the decision tree 164 starts out as an initial input score, which is adjusted at each traversed node using the percentage weight assigned to the traversed node. For example, assuming the initial input score is 100 and nodes 301-308 are assigned percentage weights of 150%, 100%, 100%, 50%, 100%, 75%, 100%, and 200% respectively, the rating score at the leaf 309 may be calculated as follows:

100(initial input score)×150%(1.5;weight assigned to node301)×100%(1.0;weight assigned to node302)×100%(1.0;weight assigned to node303)×50%(0.5;weight assigned to node304)×etc.

It is to be noted that percentage weights assigned to nodes between the node 308 and the node 309 (FIG. 7, "Other nodes") are not shown. In the example of FIG. 8, the leaf node 309 gives a rating score of 127 for illustration purposes only. As can be appreciated, weights may be assigned and adjusted by machine-learning or similar algorithm.

The rating score generated by the decision tree 164 may be adjusted based on cybersecurity intelligence provided by one or more cybersecurity services 166. Table 1 below shows example adjustments that may be made to the rating score generated by the decision tree 164.

TABLE 1

| Cybersecurity Intelligence | Score Percentage |
| --- | --- |
| Confirmed Malicious | 200% |
| Highly Potentially Malicious | 150% |
| Possibly Potentially Malicious | 100% |
| Somewhat Potentially Malicious | 75% |
| Confirmed Safe | 50% |

A distributed configuration profile may be provided to a cybersecurity service 166 for evaluation, with the result of the evaluation being used as cybersecurity intelligence on the profile. In one embodiment, referring to Table 1, a distributed configuration profile is Confirmed Malicious when all of the cybersecurity services 166 find the profile to be malicious. In that case, the overall score is 200% of the rating score generated by the decision tree 164. On the other hand, a distributed configuration profile is Confirmed Safe when all of the cybersecurity services 166 find the profile to be safe, i.e., a normal file, in which case the overall score is 50% of the rating score generated by the decision tree 164. In between Confirmed Malicious and Confirmed Safe, depending on the number and accuracy of the intelligence provided by cybersecurity services 166, a distributed configuration profile may be deemed to be Highly Potentially Malicious, Possibly Potentially Malicious, and Somewhat Potentially Malicious (e.g., only some reports of maliciousness). The effect of the cybersecurity intelligence on the overall score decreases as the possibility of the distributed configuration profile being malicious decreases, in this case from 200% (2.0×rating score; Confirmed Malicious) to 50% (0.5×rating score; Confirmed Safe). The cybersecurity intelligence thus provides additional weighing, which may be adjusted to suit particular applications. This way, the overall score not only reflects the rating score generated by the decision tree 164 but also leverages cybersecurity intelligence from other sources, thus helping minimize false positives.

Table 2 below shows example response actions that may be taken by the profile checker 161 based on the overall score.

TABLE 2

| RESPONSE ACTION | Overall Score Range |
| --- | --- |
| Block the installation; warn and ask user for confirmation | >100 |
| Warn user | 61-100 |
| Inform user that a distributed configuration profile has been installed | 30-60 |
| Deem Safe | <30 |

In the example of Table 2, a distributed configuration profile is deemed malicious when the overall score is over 100 and is deemed safe when the overall score is less than 30. The default response actions and overall score ranges may be adjusted by the user to suit her needs.

Figure 9:
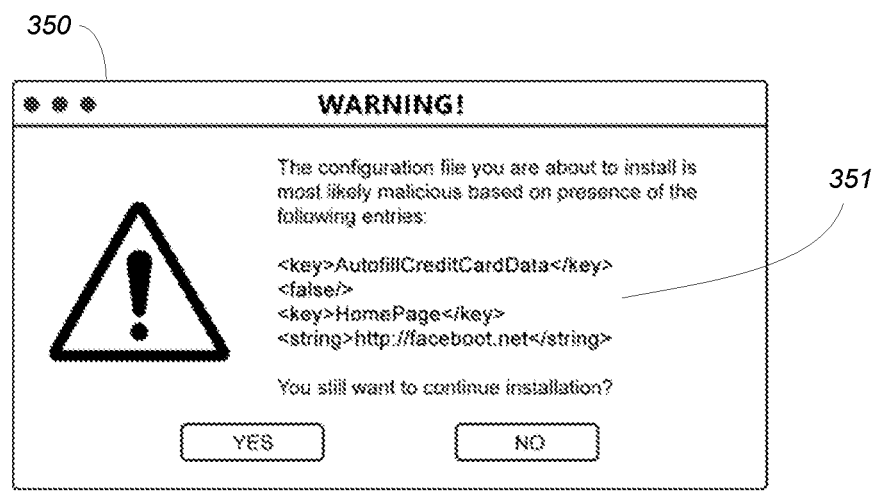
FIG. 9 shows a warning message responsive to detecting a malicious distributed configuration profile in accordance with an embodiment of the present invention.

In the example of Table 2, when the overall score is greater than 100, the profile checker 161 blocks the installation of the distributed configuration profile and asks the user for confirmation. For example, as illustrated in FIG. 9, the profile checker 161 may display a pop-up warning message 350 on the display screen of the endpoint computer 160. In the example of FIG. 9, the message 350 warns the user that the distributed configuration profile that is about to be installed is most likely malicious. The message 350 also shows a section 351 (e.g., XML keys-values) taken from entries in the distributed configuration profile for proof or support. The message 350 gives the user the option to continue installation in case the user is very certain that the distributed configuration profile is safe.

In the example of Table 2, no action is performed when the overall score is less than 30, i.e., deemed safe. An overall score in the range of 30-60 indicates that although the distributed configuration profile has not been deemed to be safe, the overall score is low enough that the distributed configuration profile is probably safe, so the user only needs to be informed that the distributed configuration profile has been or will be installed. An overall score in the range of 61-100 does not definitively indicate a malicious distributed configuration profile, but the overall score is high enough to warn the user, e.g., via a pop-up message, that the distributed configuration profile she is about to install is possibly malicious.

Figure 10:
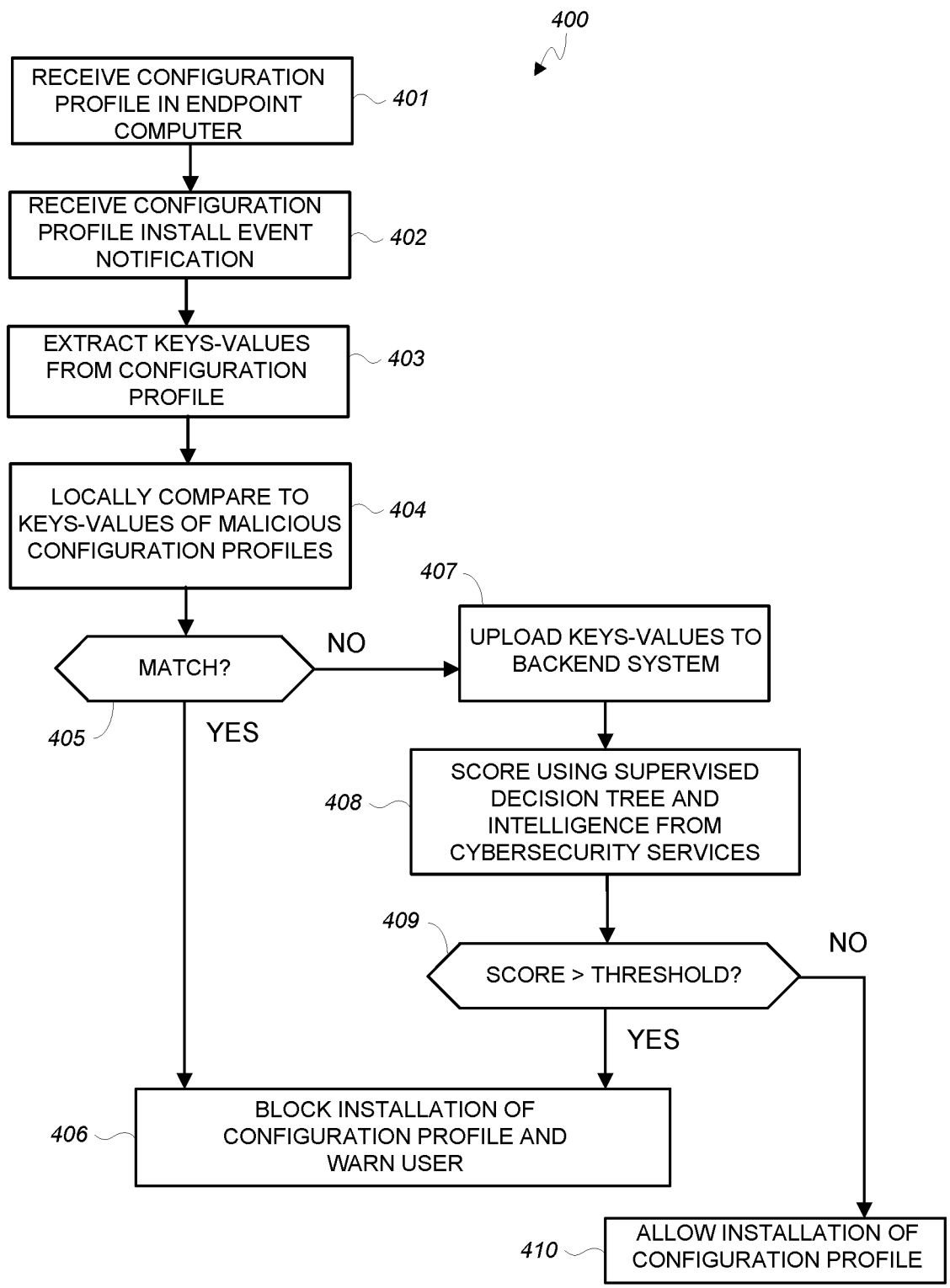
FIG. 10 shows a method of protecting computers from malicious distributed configuration profiles in accordance with an embodiment of the present invention.

FIG. 10 shows a flow diagram of a method 400 of protecting computers from malicious distributed configuration profiles in accordance with an embodiment of the present invention. The method 400 is explained using previously disclosed components. Other components may also be employed without detracting from the merits of the present invention.

In the method 400, a distributed configuration profile is received in an endpoint computer that runs a profile checker (step 401). The profile checker receives, from an operating system of the endpoint computer, a distributed configuration profile install event notification in response to the profile being installed in the endpoint computer (step 402). In response to receiving the install event notification, the profile checker receives the distributed configuration profile and extracts keys and corresponding values ("keys-values") of the distributed configuration profile (step 403). The profile checker locally compares the keys-values of the distributed configuration profile to keys-values of malicious distributed configuration profiles that are locally stored in the endpoint computer (step 404). The profile checker deems the distributed configuration profile to be malicious when the keys-values of the distributed configuration profile matches those of keys-values of malicious distributed configuration profiles. In that case, the profile checker blocks installation of the distributed configuration profile and/or warns the user (step 405 to step 406).

When the keys-values of the distributed configuration profile do not match those of malicious distributed configuration profiles, the profile checker uploads the distributed configuration profile to a backend system over the Internet (step 405 to step 407). In the backend system, an overall score is generated for the distributed configuration profile using a supervised decision tree and cybersecurity intelligence from cybersecurity services (step 408). For example, the supervised decision tree may be traversed using keys-values of the distributed configuration profile to generate a rating score, which is adjusted based on the cybersecurity intelligence to generate the overall score.

The profile checker receives the overall score and compares the overall score to a threshold (step 409). If the overall score is not greater than the threshold, the profile checker detects the distributed configuration profile to be safe and accordingly allows the distributed configuration profile to be installed in the endpoint computer (step 409 to step 410). Otherwise, if the overall score is greater than the threshold, the profile checker detects the distributed configuration profile to be malicious and accordingly blocks installation of the distributed configuration profile and/or warns the user (step 409 to step 406).

Figure 11:
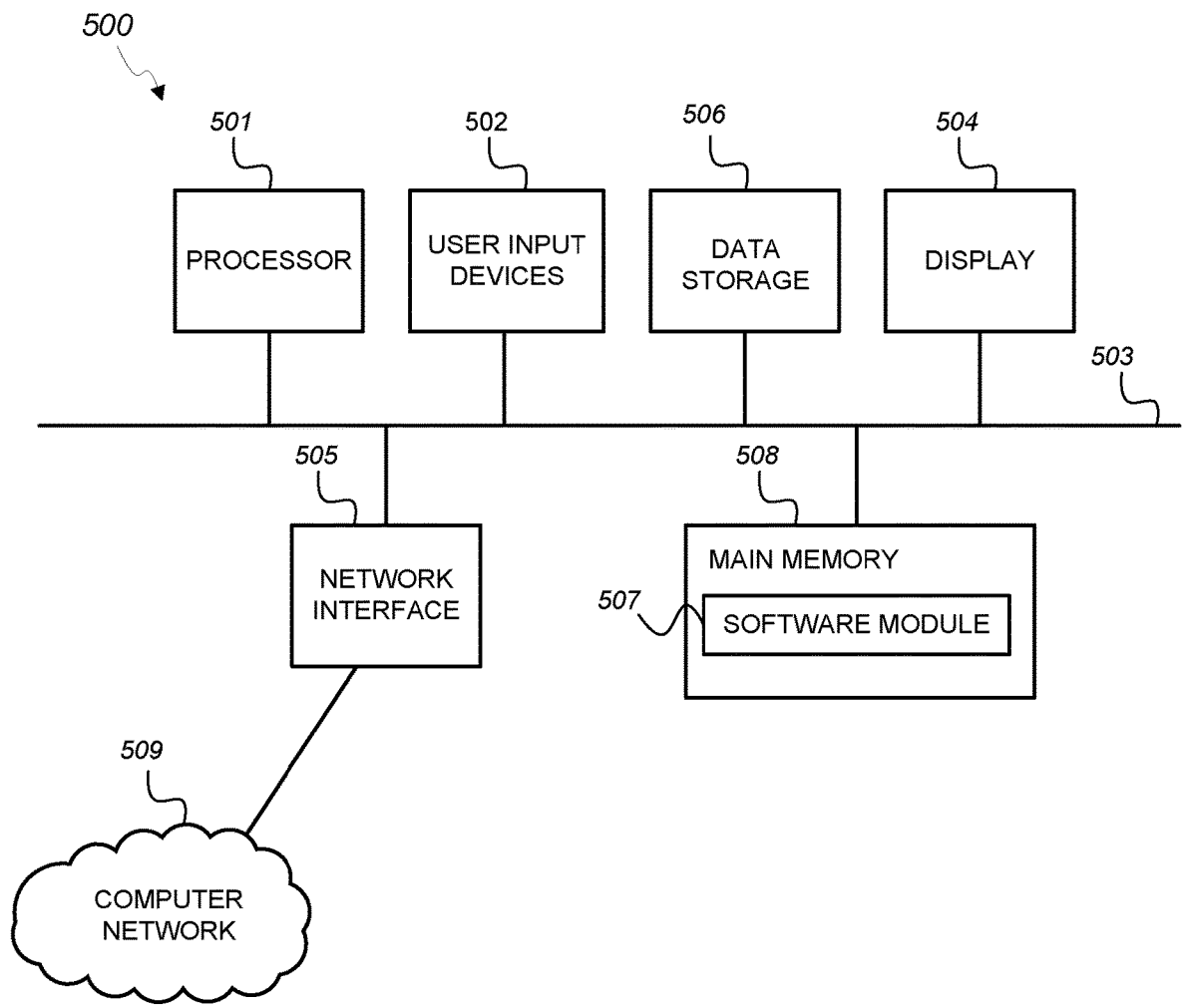
FIG. 11 shows a logical diagram of a computer system that may be employed with embodiments of the present invention.

Referring now to FIG. 11, there is shown a logical diagram of a computer system 500 that may be employed with embodiments of the present invention. The computer system 500 may be employed as an endpoint computer, backend system, or other computer described herein. The computer system 500 may have fewer or more components to meet the needs of a particular cybersecurity application. The computer system 500 may include one or more processors 501. The computer system 500 may have one or more buses 503 coupling its various components. The computer system 500 may include one or more user input devices 502 (e.g., keyboard, mouse), one or more data storage devices 506 (e.g., hard drive, optical disk, solid state drive), a display screen 504 (e.g., liquid crystal display, flat panel monitor), a computer network interface 505 (e.g., network adapter, modem), and a main memory 508 (e.g., random access memory). The computer network interface 505 may be coupled to a computer network 509, which in this example includes the Internet.

The computer system 500 is a particular machine as programmed with one or more software modules 507, comprising instructions stored non-transitory in the main memory 508 for execution by the processor 501 to cause the computer system 500 to perform corresponding programmed steps. An article of manufacture may be embodied as computer-readable storage medium including instructions that when executed by the processor 501 cause the computer system 500 to be operable to perform the functions of the one or more software modules 507.

In one embodiment where the computer system 500 is configured as an endpoint computer, the software modules 507 may comprise a distributed configuration profile checker. In one embodiment where the computer system 500 is configured as a backend system, the software modules 507 may comprise a supervised decision tree and a scoring module.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of protecting computers from malicious distributed configuration profiles, the method comprising:
   receiving a distributed configuration profile in an endpoint computer over a computer network, the distributed configuration profile being in Extensible Markup Language (XML) format and indicating at least one user-configurable setting of the endpoint computer;
   before installing the distributed configuration profile in the endpoint computer, traversing a supervised decision tree using XML keys and corresponding values of the XML keys of the distributed configuration profile, the supervised decision tree comprising a plurality of nodes that represent XML keys and a plurality of arcs that represent values of XML keys that are represented as nodes;
   generating a rating score of the distributed configuration profile based on weights assigned to nodes that are traversed in the supervised decision tree using the XML keys and the corresponding values of the XML keys of the distributed configuration profile; and
   deeming the distributed configuration profile to be malicious based at least on the rating score.

2. The method of claim 1, wherein the supervised decision tree is traversed using the XML keys and the corresponding values of the XML keys of the distributed configuration profile in response to detecting that the XML keys and the corresponding values of the XML keys of the distributed configuration profile do not match patterns of known malicious distributed configuration profiles that are locally available in the endpoint computer.

3. The method of claim 1, further comprising:
   in response to deeming the distributed configuration profile to be malicious, displaying a warning message on a display screen of the endpoint computer.

4. The method of claim 3, wherein the warning message includes XML keys of the distributed configuration profile that are indicative of being malicious.

5. The method of claim 1, further comprising:
   in response to deeming the distributed configuration profile to be malicious, blocking installation of the distributed configuration profile in the endpoint computer.

6. The method of claim 1, further comprising:
forwarding at least the XML keys and the corresponding values of the XML keys of the distributed configuration profile from the endpoint computer to a backend system over the computer network,
wherein the supervised decision tree is traversed in the backend system using the XML keys and the corresponding values of the XML keys of the distributed configuration profile.

7. The method of claim 1, further comprising:
generating an overall score by adjusting the rating score based on cybersecurity intelligence on the distributed configuration profile; and
providing the overall score to the endpoint computer over the computer network.

8. The method of claim 1, wherein generating the rating score of the distributed configuration profile comprises:
assigning an initial input score; and
adjusting the initial input score based on the weights assigned to the nodes that are traversed in the supervised decision tree.

9. The method of claim 8, wherein the weights assigned to the nodes that are traversed in the supervised decision tree are percentage weights.

10. A system for protecting computers against malicious distributed configuration profiles, the system comprising:
an endpoint computer comprising a memory and a processor, the memory of the endpoint computer storing instructions that when executed by the processor of the endpoint computer cause the endpoint computer to detect that a distributed configuration profile is malicious based at least on a rating score of the distributed configuration profile; and
a backend system comprising a memory and a processor, the memory of the backend system storing instructions that when executed by the processor of the backend system cause the backend system to, before installation of the distributed configuration profile in the endpoint computer:
receive Extensible Markup Language (XML) keys and corresponding values of the XML keys of the distributed configuration profile from the endpoint computer over a computer network;
traverse a supervised decision tree using the XML keys and the corresponding values of the XML keys of the distributed configuration profile, the supervised decision tree comprising a plurality of nodes that represent XML keys and a plurality of arcs that represent values of XML keys that are represented as nodes; and
generate the rating score of the distributed configuration profile based on weights assigned to nodes that are traversed in the supervised decision tree using the XML keys and the corresponding values of the XML keys of the distributed configuration profile.

11. The system of claim 10, wherein the instructions stored in the memory of the endpoint computer, when executed by the processor of the endpoint computer, cause the endpoint computer to:
display a warning message on a display screen of the endpoint computer in response to detecting that the distributed configuration profile is malicious.

12. The system of claim 11, wherein the warning message includes an entry in the distributed configuration profile that is indicative of being malicious.

13. The system of claim 10, wherein the instructions stored in the memory of the endpoint computer, when executed by the processor of the endpoint computer, cause the endpoint computer to:
block installation of the distributed configuration profile in the endpoint computer in response to detecting that the distributed configuration profile is malicious.

14. The system of claim 10, wherein the instructions stored in the memory of the backend system, when executed by the processor of the backend system, cause the backend system to:
generate an overall score by adjusting the rating score based on received cybersecurity intelligence on the distributed configuration profile; and
provide the overall score to the endpoint computer.

15. The system of claim 14, wherein the instructions stored in the memory of the endpoint computer, when executed by the processor of the endpoint computer, cause the endpoint computer to:
compare the overall score to a threshold; and
detect that the distributed configuration profile is malicious in response to the overall score exceeding the threshold.

16. A method of protecting computers from malicious distributed configuration profiles, the method comprising:
receiving a distributed configuration profile in an endpoint computer over a computer network, the distributed configuration profile being in Extensible Markup Language (XML) format and indicating at least one user-configurable setting of the endpoint computer;
forwarding the distributed configuration profile from the endpoint computer to a backend system over the computer network;
before the distributed configuration profile is installed in the endpoint computer, in the backend system, traversing a supervised decision tree using XML keys and corresponding values of the XML keys of the distributed configuration profile, the supervised decision tree comprising a plurality of nodes that represent XML keys and a plurality of arcs that represent values of XML keys that are represented as nodes;
generating, in the backend system, a rating score of the distributed configuration profile based on weights assigned to nodes that are traversed in the supervised decision tree using the XML keys and the corresponding values of the XML keys of the distributed configuration profile; and
in the endpoint computer, deeming the distributed configuration profile to be malicious based at least on the rating score of the distributed configuration profile.

17. The method of claim 16, further comprising generating an overall score by adjusting the rating score based on received cybersecurity intelligence on the distributed configuration profile, wherein the distributed configuration profile is deemed to be malicious based at least on the overall score.

18. The method of claim 17, further comprising:
in the endpoint computer, comparing the overall score to a threshold, wherein the distributed configuration profile is deemed to be malicious in response to the overall score exceeding the threshold.

19. The method of claim 16, further comprising:
displaying a warning message on a display screen of the endpoint computer in response to the distributed configuration profile being deemed to be malicious.

20. The method of claim 19, wherein the warning message displays an XML key and a value of the XML key of the distributed configuration profile.

* * * * *